United States Patent [19]

Spradley et al.

[11] Patent Number: 4,714,238
[45] Date of Patent: Dec. 22, 1987

[54] HYDRAULIC JACKING SYSTEM FOR UNSEATING WEDGE FROM ROPE SOCKETS

[76] Inventors: Willie D. Spradley, Rte. 2, Box 155 G, Carthage, Tex. 75633; Paul J. Creswell, Rte. 1, Box 274, Beckville, Tex. 75631

[21] Appl. No.: 22,033

[22] Filed: Mar. 5, 1987

[51] Int. Cl.⁴ .............................................. B66F 3/24
[52] U.S. Cl. ...................................... 254/93 R; 29/252
[58] Field of Search ............... 24/115 M, 136 K, 603; 59/85; 29/252, 251; 254/93 R

[56] References Cited

U.S. PATENT DOCUMENTS

| | | | |
|---|---|---|---|
| 1,899,351 | 2/1933 | Overfelt | 29/252 |
| 3,880,604 | 4/1975 | Hawkins | 29/252 |
| 4,477,956 | 10/1984 | Mefford | 29/252 |
| 4,506,501 | 3/1985 | DeVall et al. | 29/252 |
| 4,558,502 | 12/1985 | Gossmann et al. | 29/252 |

*Primary Examiner*—Robert C. Watson
*Attorney, Agent, or Firm*—Gunn, Lee & Jackson

[57] ABSTRACT

An apparatus for unseating wire rope wedges is accomplished by means of a linear motor such as a hydraulic jack mechanism. The hydraulic jack includes a housing structure adapted to be seated about a portion of a wire line connector device in such manner that a force transmitting retained relationship is established between the housing and the wire rope connector. A linear actuator within the housing is energized against the small end of a wire rope wedge and accomplishes movement of the wedge to its unseated position to release wire rope secured thereby.

12 Claims, 6 Drawing Figures

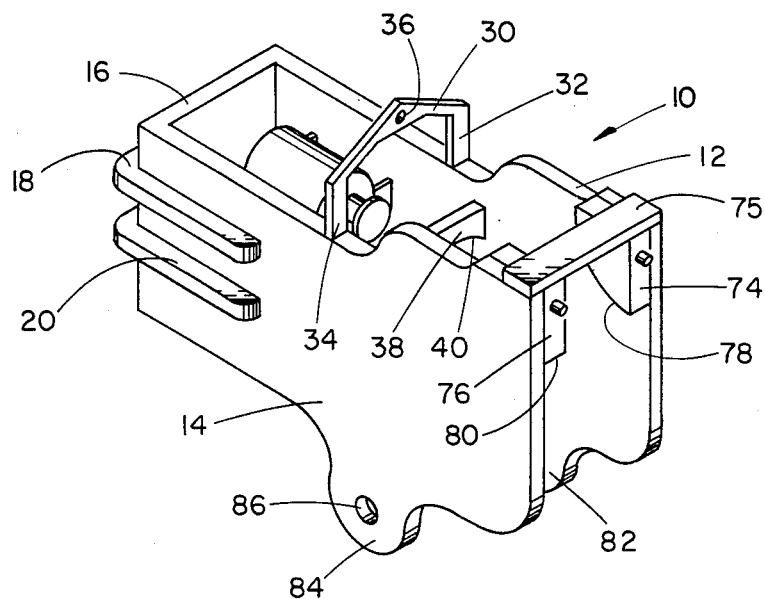
FIG. 1
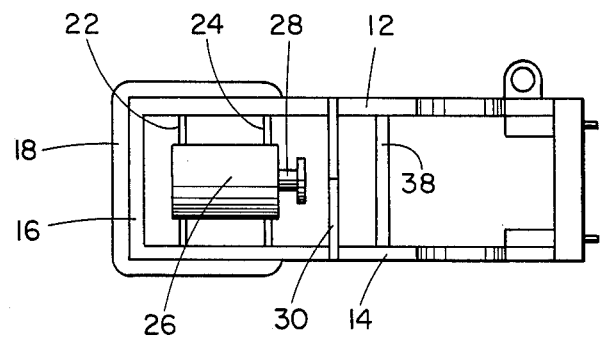
FIG. 2
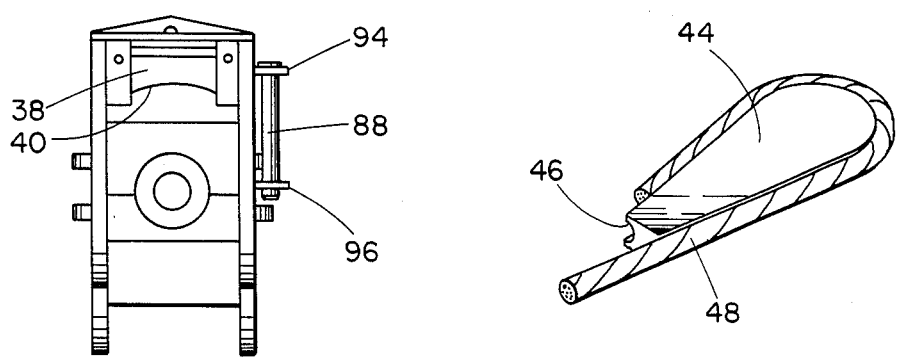
FIG. 3
FIG. 4

HYDRAULIC JACKING SYSTEM FOR UNSEATING WEDGE FROM ROPE SOCKETS

FIELD OF THE INVENTION

This invention relates generally to wire rope connectors for large drag line systems such as are commonly employed in open pit mining activities for coal and other materials. More specifically, the present invention is directed to apparatus for unseating wire rope securing wedges from wedge sockets defined by wire rope connectors.

BACKGROUND OF THE INVENTION

In order to carry out open pit mining activities for coal and other minerals, large drag line machines are utilized to strip away overburden in order to expose the minerals for removal. Large drag line machines are employed which are provided with large buckets. Each of the drag line buckets is provided with a bridle having one or more chains extending from the bridle. The drag line machine employs a large draw works mechanism from which extends one or more large cables which are typically referred to in the industry as rope or wire rope. In order to establish a connection between the wire rope and the chain of the drag line bucket, large wire rope connectors are employed which are secured by pins or clevises to the end link of the bridle chain. These large wire rope connectors define a tapered internal socket within which is received a wire rope restraining wedge having an arcuate peripheral groove receiving the end portion of the wire rope. The wire rope is installed by extending it through the socket of the wire rope connector and by looping the end portion of the rope about the peripheral groove of a wedge that is unseated from the socket. The wedge with the rope disposed thereabout is then inserted into the tapered socket. Force is then applied to the wire rope while restraining the free end sufficiently to force the wedge tightly into the socket. When this occurs the end portion of the wire rope will be tightly secured to the wire rope connector by means of the binding activity of the wedge. As drag line operations are conducted force is applied to the wire rope by the draw works of the drag line mechanism. This force tends to more tightly seat the wedge within the socket and thus more tightly bind the end portion of the wire rope. In fact the wire rope and wedge often become so tightly seated within the socket that it is very difficult to accomplish unseating of the wedge by means of conventional equipment or tools.

During operation of the drag line mechanism, the wire rope may tend to slip thereby pulling partially from its looped condition about the wedge. In other cases the wire rope may become completely separated from its wedged connection with the wire rope connector or the wire rope may break. In these cases it is necessary to reconnect the wire rope with the wire rope connector. Frequently the wedge and wire rope will have become so tightly seated within the socket that it may be necessary to cut the wire rope away such as through use of a cutting torch, cutting chisels, etc. When wire rope repair or replacement becomes necessary it is desirable to forcibly unseat the wire rope wedge from its socket. In this case, the practice in the industry has been to employ a winch truck for supporting a battering ram in position so that the end portion of the battering ram will strike the small end of the wedge. The battering ram is then manipulated by a number of workers and is swung back and forth causing its end to strike the small end of the wedge. Obviously the wedge may be damaged during this process thus requiring its replacement. Use of a battering ram for removing wire rope wedges has proven to be a hazardous operation from the standpoint of personnel safety. Many workers have been injured as the heavy battering ram is manually moved back and forth during battering activities. In addition to the dangerous nature of removing wire rope wedges by means of batteriwng rams, the wedge removal activity typically requires a number of hours of battering activity to unseat the wedge because the wedge will have been seated by a pulling force on the wire rope which may be in the range of 2,000,000 pounds.

It is desirable therefore to provide a mechanism for simply and efficiently unseating wire rope wedges from wire rope connectors to minimize labor requirements, to render the wedge removal operation safe and to minimize drag line equipment down time for this type of repair operation.

SUMMARY OF THE INVENTION

It is therefore a primary feature of the present invention to provide a novel hydraulic jack mechanism that is operative to restrain a wire rope connector and apply a sufficient force to the small end portion of a wire rope wedge that it becomes unseated and thereby releases the wire rope secured thereby.

It is also a feature of this invention to provide a novel mechanism for unseating wire rope wedges that may be operated by a minimum number of workers and through use of minimal equipment.

It is an even further feature of this invention to provide a novel mechanism for unseating wire rope wedges which may be efficiently brought to the site of a drag line operation and used on site for wire rope reinstallation or repair.

It is an even further feature of this invention to provide novel apparatus for unseating wire rope wedges which does not pose significant danger to workers utilizing it.

Other and further features of this invention will become obvious to one skilled in the art upon an understanding of the apparatus described hereinbelow.

Briefly, the present invention is realized through the provision of a jack mechanism which is capable of being brought into restraining assembly with a wire rope connector. The jack mechanism incorporates a linear power actuator hydraulic cylinder having a ram which is positioned to engage the small end portion of the wedge of the wire rope connector. The power actuator ram has sufficient force application capability that it will unseat the most tightly wedge that can be expected in drag line operations. The hydraulic jack apparatus is adapted to be supported by an overhead cable such as the cable of a winch truck and is simply guided into assembled relationship with the wire rope connector. The apparatus may therefore be operated by only two personnel, i.e., the winch truck operator and a worker to guide and position the jack mechanism in to assembly with the wire rope connector and to control energization of the power actuator.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiment thereof which is illustrated in the appended drawings which drawings from a part of this specification.

It is to be noted, however, that the appended drawings illustrate only a typical embodiment of this invention and are therefore not to be considered limiting of its scope, for the invention may admit to other equally effective embodiments.

IN THE DRAWINGS

Figure 5:
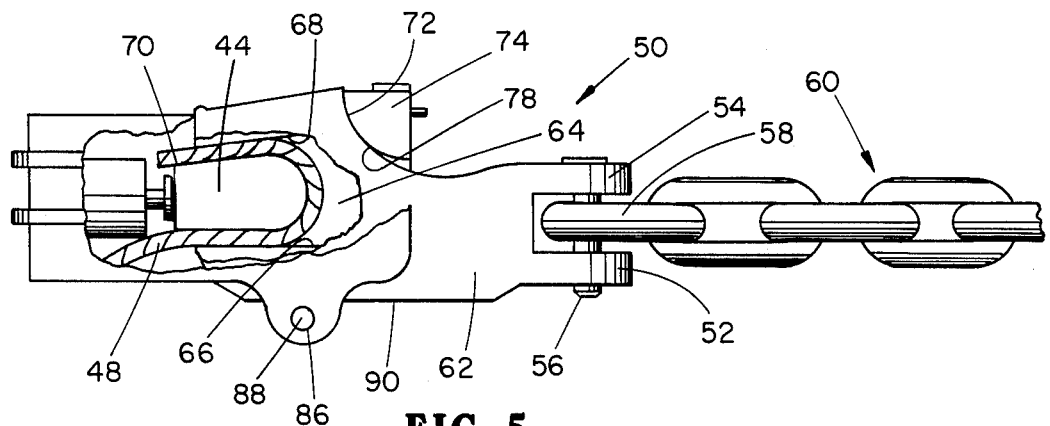
Figure 6:
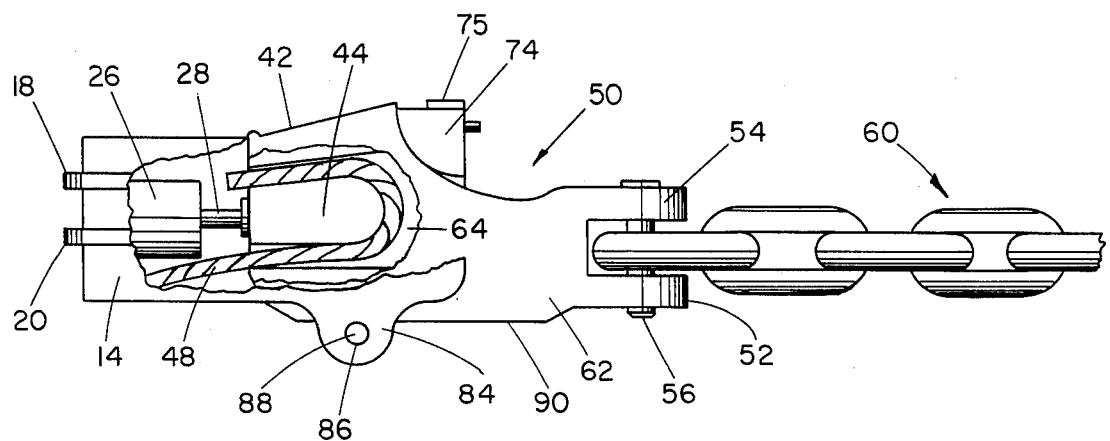

FIG. 1 is an isometric illustration of a hydraulic jack mechanism constructed in accordance with the present invention;

FIG. 2 is a plan view of the apparatus of FIG. 1;

FIG. 3 is an end view of the apparatus of FIG. 1 showing the restraining pin thereof being supported by its side brackets;

FIG. 4 is an isometric illustration of a wire rope wedge showing a length of wire rope disposed thereabout;

FIG. 5 is a side view of the assembly of the hydraulic jack of FIG. 1 to a wire rope connector, with parts thereof broken away, to show the positions of the internal components thereof; and FIG. 6 is a side view similar to that of FIG. 5 illustrating unseating movement of the wedge by the ram of the power actuator.

DETAILED DESCRIPTION OF THE PREFERRED EMBODIMENT

Referring now to the drawings and first to FIG. 1, a power actuator jack mechanism for unseating wire rope wedges is illustrated generally at 10 and is shown in position for assembly to a wire rope connector such as shown at 50 in FIGS. 5 and 6. Although the power actuator set forth herein is illustrated and described primarily as a hydraulic power actuator, such is not intended to limit the spirit and scope of this invention. It is to be understood that other types of power actuators such as mechanical, electrical, etc. may be employed without departing from the spirit and scope hereof. The power actuated jack mechanism incorporates a pair of side plates 12 and 14 which are formed from plate metal. Typically the side plates are composed of steel and are in the order of 1 inch in thickness. The rear portion of the power actuated jack mechanism is defined by a thrust plate 16. Reinforcing tie members or flanges 18 and 20 are welded or otherwise secured to the thrust plate 16 and to the side plates 12 and 14 for the purpose of strengthening the thrust plate 16 and insuring efficient transmission of forces from the thrust plate to the side plates.

A pair of transverse support plates 22 and 24 are welded to the side plates 12 and 14 and provide support for a linear power actuator such as the hydraulic cylinder 26. The hydraulic cylinder 26 is provided with a ram 28 which is positioned to engage the small end of wire rope wedge as will be discussed hereinbelow. The rear portion of the cylinder 26 engages the thrust plate 16 and thus transmits wedge pushing force of the hydraulic cylinder to the thrust plate. The hydraulic cyliner is energized by a typical hydraulic circuit which may be controlled in any suitable manner To provide for lifting and handling of the power actuated jack mechanism, which typically will weigh several hundred pounds, a lifting bridle 30 is provided with its side portions 32 and 34 secured respectively to the side plates 12 and 14. The lifting bridle defines a lifting eye 36 which receives any suitable connector such as the bolt of a clevis for example, supported by the wire rope of a winch truck.

For support of the hydraulic jack apparatus in assembly with a wire rope connector in the manner shown in FIGS. 5 and 6 a transverse saddle plate 38 is connected with respective side plates 12 and 14 and is provided with an arcuate lower surface 40 which engages the arcuate upper surface 42 of a wire rope connector. Obviously, the surface 40 may be of any suitable configuration which establishes an interfitting relationship with the upper portion of a wire rope connector.

As illustrated in FIG. 4 a wire rope wedge 44 is shown which defines a peripheral groove 46 within which the end portion of the wire rope 48 is disposed. A wire rope connector is illustrated generally at 50 in FIGS. 5 and 6 and defines bifurcated flanges 52 and 54 which form a clevis arrangement. A connector pin 56 extends through openings in the flanges 52 and 54 and secures the end link 58 of bridle chain 60 to the connector device. As explained above, the bridle chain 60 is connected to a drag line bucket of sufficient dimension to contain 15 to 20 cubic yards of overburden material or other material. The connector assembly defines a body structure 62 forming an internal tapered socket 64 within which the wedge 44 is received. As shown in FIGS. 5 and 6 the wire rope 48 is wedged against converging internal surfaces 66 and 68 of the socket 64. As force is applied to the wire rope 48 the wedge member 44 will be forced to the position shown in FIG. 5 where a small end portion 70 thereof extends from the small end of the socket 64.

A typical wire rope connector defines a pair of spaced arcuate surfaces 72. To establish a restraining relationship between the wire rope connector and the housing structure, the housing is provided with a pair of spaced internal stop shoulders 74 and 76 each forming curved surfaces 78 and 80 corresponding with the spaced curve surfaces 72 of the wire rope connector as shown in FIGS. 5 and 6.

The lower portions of the side plates 12 and 14 define depending tab members 82 and 84 respectively, which form registering apertures 86. A transverse restraining pin 88 is extended through the registering apertures 86 and extends transversely immediately beneath the lower surface 90 of the wire rope connector. As the ram member 28 of the linear motor 26 moves from the position shown in FIG. 5 and engages the wedge member 44 the wedge will not immediately be released. Rather, the housing will pivot about the curved restraining surfaces 78 and 80 of the shoulder member 74 and 76 thereby bringing the transverse pin member 88 into engagement with the lower surface 90 of the wire rope connector. After this has occurred, further movement of the housing will be restrained cooperatively by the spaced shoulders and the transverse pin. Further movement of the ram member 28 will result in unseating movement of the wedge from the position shown in FIG. 5 to the unseated position shown in FIG. 6. In the position of the wedge shown in FIG. 5 the cable 48 is tightly wedged into place within the socket 64 and will ordinarily resist the pulling forces of the drag line mechanism. In fact, the more force applied to the cable the tighter the wedge member will seat and thus the more secure will be the connection between the wire rope and the wire rope connector. In the position shown in FIG. 6 the wedge will have released the wire rope thereby permitting the wire rope to be withdrawn from the socket 64. In the event the wire rope should break or should need any other sort of repairs it will not be necessary to cut away the cable by means of cutting torches or employ a battering ram for unseating of the wedge member.

OPERATION

When it becomes desirable to unseat a wire rope wedge and accomplish wire rope replacement, repair or reseating, the jack mechanism will be transported to the sight of the wire rope connector such as by means of a winch truck and will then be lifted such as by the winch mechanism of the truck. In this case the jack mechanism is freely suspended and may be efficiently guided by a single worker into properly seated relationship with respect to the wire rope connector. The jack mechanism with the transverse restraint pin 88 removed from the openings 86 and perhaps supported by the pin support tabs 94 and 96 as shown in FIG. 3, is lowered onto the socket portion of the wire line connector essentially as shown in FIGS. 5 and 6. The housing structure of the jack is shifted manually until the curved surfaces 78 and 80 of the stop or restraining shoulders 74 and 76 come into seated contact with the correspondingly curved surfaces 72 of the wire line connector. The transverse restraint pin 88 is then inserted through the registering apertures 86 of the tab members 82 and 84. The housing is lowered until the curved surface 40 of the saddle plate 38 comes into supporting engagement with the upper surface 42 of the wire line connector. The linear actuator motor is then activated causing the ram 28 to move into force applying engagement with the small end portion of the wedge member 44. The pushing force of the ram will be increased until the resistance of the seated wedge member 44 is overcome, thereby allowing the wedge to become unseated for movement by the ram member to the position shown in FIG. 6. This jacking movement will release the wire rope 48 thereby enabling it to be removed and replaced. Ordinarily the wedge member 44 will be extracted from the socket 64 to permit wrapping of the wire rope 48 about the wedge in the manner shown in FIGS. 4, 5 and 6. The wedge and the loop wire rope will then be reinserted into the socket and sufficient force will be applied to properly seat the wedge and secure the wire rope. After a wedge has been unseated in the manner discussed above, and before reinstallation of the wedge and wire rope, the transverse restraint pin 88 will be removed from the apertures 86. To prevent loss of the transverse restraint pin it will be inserted in the aligned apertures of the pin support tabs 94 and 96. The jack housing is removed from the wire rope connector simply by applying an upwardly directed force on the lifting bridle 30. This will typically be accomplished by means of the wire rope of a winch truck.

It should be borne in mind that the linear motor actuator 26 may take any suitable form within the spirit and scope of the present invention. Although shown in the drawings primarily as a hydraulic motor driving a piston energized ram 28 against the small end of the rope wedge 44 it should be borne in mind that the linear actuator may take any one of a number of suitable forms without departing from the spirit and scope of this invention. For example, an electrically energized power operator may be employed or a manually energized mechanical jack may be employed.

In view of the foregoing it is clear that the present invention provides an efficient means for accomplishing unseating of a wire rope wedge without necessitating the use of battering rams, cutting torches or other unsuitable systems for accomplishment of this activity. The power energized jack mechanism of this invention may be efficiently employed with a minimum number of workers and may be used safely to quickly unseat wire rope wedges from wire rope connectors such as shown in FIGS. 5 and 6. The method and apparatus set forth herein are therefore deemed to accomplish all of the objects and features hereinabove set forth together with other features which become inherent from a description of the apparatus itself. The embodiments set forth herein are intended only as illustrative and therefore are not to be taken in any limiting sense.

What is claimed is:

1. Apparatus for unseating wire rope wedges from the wire rope connectors of drag line system and other heavy duty equipment wherein said wire rope connectors define a tapered socket within which is received a tapered wedge that secures an end of the wire rope within the wire rope connector, comprising:
   (a) a housing adapted to be disposed about at least a portion of said wire rope connector;
   (b) shoulder means within said housing positioned for restraining engagement with a portion of said wire rope connector;
   (c) a transverse restraining pin supported by said housing and being positioned for restraining engagement with another portion of said wire rope connector; and
   (d) power energized means supported by said housing and imparting an unseating force to said wedge and moving said wedge to said unseated position within said socket for release of wire rope disposed about said wedge.

2. Apparatus as recited in claim 1 wherein said shoulder means comprises a pair of spaced internal thrust shoulders provided within said housing means and being disposed for engagement with respective opposed portions of said wire rope connector.

3. Apparatus as recited in claim 2 wherein transverse saddle means is defined within said housing for engagement with the upper portion of said wire rope connector, said transverse saddle means establishing proper positioning of a portion of said housing relative to said wire rope connector.

4. Apparatus as recited in claim 1 wherein said means imparting an unseating force to said wedge comprises:
   (a) a linear power actuator positioned within said housing; and
   (b) a force imparting ram extending from said power actuator and being movable by said power actuator against the small end of said wedge for unseating movement of said wedge.

5. Apparatus as recited in claim 4 wherein said linear actuator comprises a hydraulic actuator imparting movement to said ram by hydraulic force.

6. Apparatus for unseating wire rope wedges from the wire rope connectors of drag line systems and other heavy duty equipment wherein said wire rope connectors define a tapered socket within which is received a tapered wedge that secures an end of the wire rope within the wire rope connector, comprising:
  (a) a housing having generally parallel side walls and a thrust transmitting wall, said housing further having internal saddle means for engagement with an upper portion of said wire rope connector to establish proper positioning of said housing relative to said wire rope connector;
  (b) opposed internal thrust shoulder means being defined internally of said housing and being positioned for engagement with spaced portions of said wire rope connector;
  (c) removable pin means extending through said housing and being positioned for engagement with a portion of said wire rope connector, said pin means cooperating with said internal shoulder means to restrain said housing in assembly with said wire rope connector;
  (d) motor support means being defined within said housing; and
  (e) a linear drive motor being supported by said motor support means and having a portion of thereof in force transmitting engagement with said thrust wall of said housing, said line drive motor having a linearly movable ram for engaging and unseating said tapered wedge to release the wire rope secured thereby.

7. Apparatus as recited in claim 6 wherein:
  (a) said spaced internal shoulder means engages an upper portion of said wire rope connector; and
  (b) said removable pin means engages a lower portion of said wireline connector.

8. Apparatus as recited in claim 7 wherein said spaced internal shoulder means define pivot means about which said housing rotates in response to force developed by said linear drive motor.

9. Apparatus as recited in claim 6 wherein said linear motor is defined by a hydraulic cylinder and said ram is moved under the influence of hydraulic pressure.

10. Apparatus as recited in claim 6 wherein reinforcing flange means is secured externally of said housing and is secured to said side plates and said thrust plate to provide reinforcing capability therewith.

11. Apparatus as recited in claim 6 wherein a lifting bridle is secured to the upper portions of said side plates and provides for support of said housing by lifting apparatus.

12. Apparatus as recited in claim 6 wherein said spaced thrust shoulders define curved surfaces for engagement with respective curved surfaces of said wire rope connector.

* * * * *